P. T. BROWNELL.
Reversing Valves for Steam-Engines.
No. 146,800.  Patented Jan. 27, 1874.
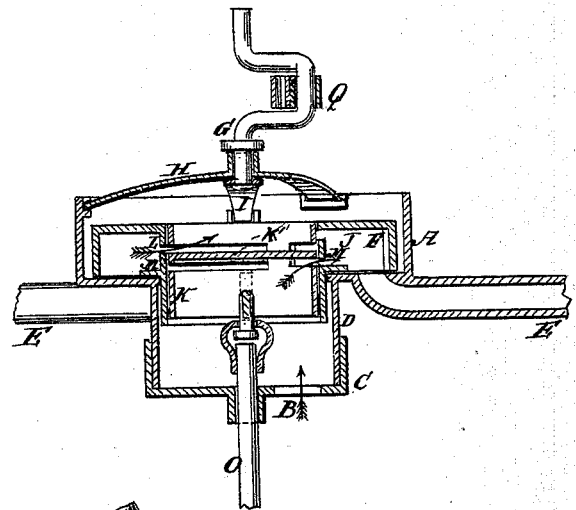
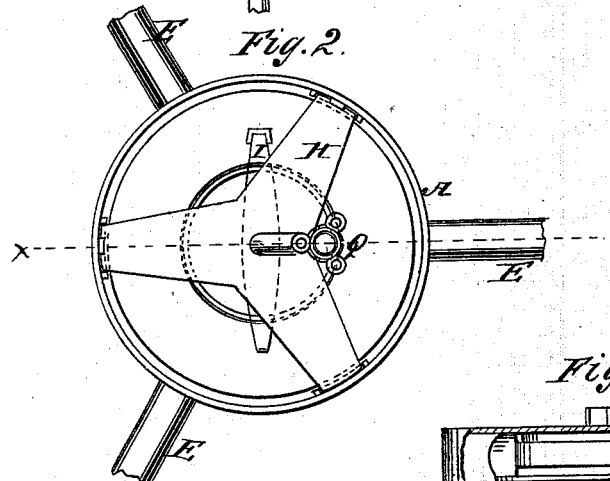
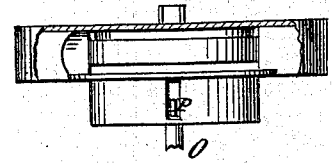
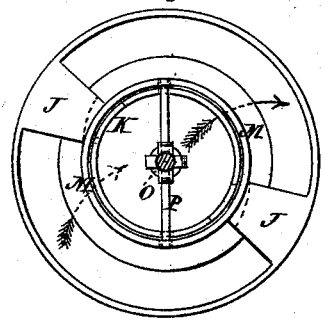
WITNESSES.
E. Wolff
O. Sedgwick
INVENTOR.
P. T. Brownell
BY
ATTORNEYS.

UNITED STATES PATENT OFFICE.

PHILIP T. BROWNELL, OF ELMIRA, NEW YORK.

IMPROVEMENT IN REVERSING-VALVES FOR STEAM-ENGINES.

Specification forming part of Letters Patent No. 146,800, dated January 27, 1874; application filed November 22, 1873.

*To all whom it may concern:*

Be it known that I, PHILIP T. BROWNELL, of the city of Elmira, in the county of Chemung and State of New York, have invented a new and useful Improvement in Reversing-Valves for Steam-Engines, of which the following is a specification:

The invention will first be fully described, and then pointed out in the claim.

In the accompanying drawing, Figure 1 is a cross-section of the valve, taken on the line $x$ $x$ of Fig. 2. Fig. 2 is a top view. Fig. 3 is an edge view of the same detached. Fig. 4 is a side view of the same.

Similar letters of reference indicate corresponding parts.

A represents the chamber, into which steam is admitted through the aperture B. This aperture is in the cup C, which fits onto the small portion D of the receiving-chamber. E E E are pipes connected with the chamber, which convey the steam to the several cylinders. F is the valve, which receives a rotating motion from the crank-shaft G. H is a spider, by means of which the shaft is supported. This spider is fitted to the upper edge of the chamber, as seen in Fig. 2. Upon the lower end of the shaft is a cross-bar, I, with a toe at the end, which takes hold of lugs on the top of the valve for revolving the valve, as seen in Fig. 2. The valve is a hollow shell, having partitions J J and a hollow tubular center, L.

K is a cylinder, which slides in the center, and has a horizontal partition, K', which separates the "live" from the "exhaust" steam. The center L has two long slot-ports, M M, and the sliding cylinder has two corresponding therewith in size and position.

The cylinder K is given a slight sliding motion, which allows either pair of these ports to register for admitting steam and exhausting it.

The reversing action is produced by means of the rod O, which is swiveled to the cross-plate P in the cylinder.

The course of the steam is indicated by the arrows. The sliding cylinder revolves with the valve. When one pair of ports are admitting steam, the opposite pair are exhausting it; and this action is instantly reversed by a slight movement of the sliding cylinder.

Q is a tubular section, which revolves freely on the crank, with which the piston-rods or cross-heads are connected for operating the valve.

Having thus described my invention, I claim as new and desire to secure by Letters Patent—

The combination in a three-cylindered engine, with hollow rotary valves F, having partitions J J, and central tube L, having ports M M, of the sliding cylinder K, having two ports, corresponding to those of tube L, as and for the purpose described.

PHILIP T. BROWNELL.

Witnesses:
 WILLIAM P. YATES,
 HENRY W. STRONG.